(No Model.)

B. F. STONE.
PIPE COUPLING.

No. 512,457. Patented Jan. 9, 1894.

Witnesses
John C. Shaw
N. J. W. Riley.

Inventor
Benjamin F. Stone.
By his Attorneys,
C. A. Snow & Co.

UNITED STATES PATENT OFFICE.

BENJAMIN FRANKLIN STONE, OF LAS VEGAS, TERRITORY OF NEW MEXICO, ASSIGNOR OF ONE-HALF TO MARK DETTERICK, OF SAME PLACE.

PIPE-COUPLING.

SPECIFICATION forming part of Letters Patent No. 512,457, dated January 9, 1894.

Application filed May 20, 1893. Serial No. 474,950. (No model.)

*To all whom it may concern:*

Be it known that I, BENJAMIN FRANKLIN STONE, a citizen of the United States, residing at Las Vegas, in the county of San Miguel and Territory of New Mexico, have invented a new and useful Pipe-Coupling, of which the following is a specification.

This invention relates to improvements in pipe couplings.

The object of the present invention is to provide a simple, inexpensive, and efficient coupling for hose and other flexible tubing, to enable hose to be readily and securely attached to the sections of the coupling, and to facilitate rapid connection and detachment of the coupling sections.

The invention consists in the construction and novel combination and arrangement of parts hereinafter fully described, illustrated in the accompanying drawings and pointed out in the claims hereto appended.

Figure 1:
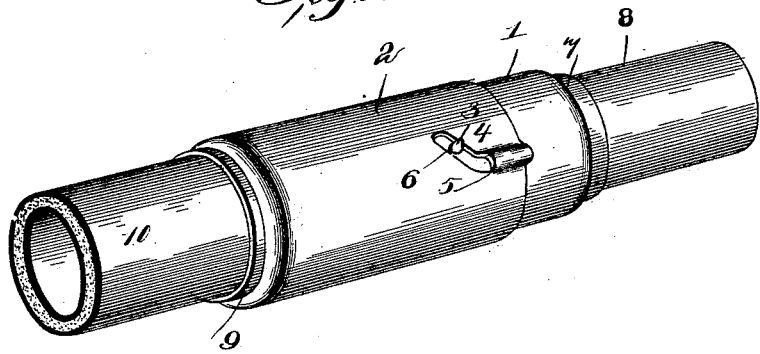
Figure 2:
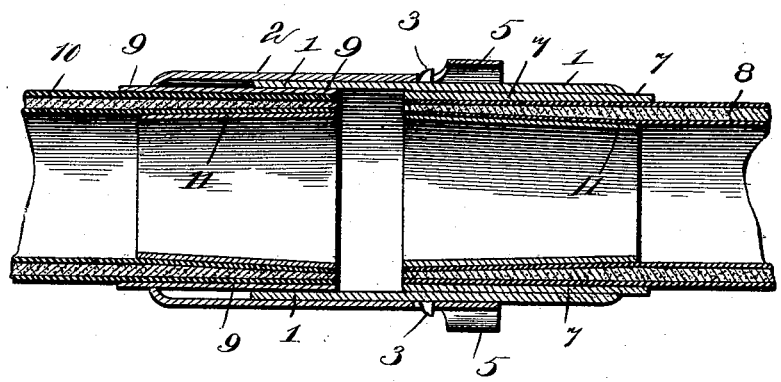

In the drawings—Figure 1 is a perspective view of a coupling embodying the invention. Fig. 2 is a longitudinal sectional view.

Like numerals of reference indicate corresponding parts in both the figures of the drawings.

1 and 2 designate cylindrical telescoping coupling sections; the inner section is provided with diametrically disposed lugs 3; and the outer section 2 is provided with bayonet ways 4 to receive the lugs 3. Each bayonet way consists of a longitudinally disposed groove 5, formed by bending the metal outward, and an inclined or angularly disposed slot 6 forming a wedge, adapted when the sections are turned to draw them together. The inner section 1 is provided at its outer end with a cylindrical lining 7, which receives a piece of hose 8, and which is arranged adjacent to the inner section 1. The outer section is provided with a cylindrical lining 9, which receives a piece of hose 10, and which is of less diameter than the outer section 2 to form an annular space between it and the outer section to receive the inner section when the sections are telescoped, in order to bring the adjacent ends of the hose together. The linings 7 and 9 are secured to their respective sections 1 and 2 by soldering, brazing, or other suitable means. Each piece of hose is firmly and securely fastened within the section to which it is applied by a tapering wedging sleeve 11, which compresses the hose against the lining receiving it. The outer end of the outer section 2 is reduced and secured to its lining in order to form the annular space for receiving the inner section 1.

It will be readily seen that the coupling is inexpensive in construction and possesses great simplicity, that it is capable of enabling hose to be readily coupled and uncoupled, and that the parts of the hose are securely fastened within the sections of the coupling.

Changes in the form, proportion and the minor details of construction may be resorted to without departing from the principle or sacrificing any of the advantages of this invention.

What I claim is—

1. In a coupling, the combination of telescoping sections, means for securing the sections together, a cylindrical lining arranged within the outer section and secured thereto at the inner end thereof and forming between it and the outer section an annular space receiving the inner section, flexible tubing arranged within the inner section and the cylindrical lining of the outer section, and the tapering wedging sleeves clamping the flexible tubing in place, substantially as described.

2. In a coupling, the combination of an outer section provided with bayonet ways composed of longitudinal grooves and inclined slots, an inner telescoping section fitting within the outer section and provided with lugs to engage the bayonet ways, the linings arranged at the outer ends of the sections, the lining of the outer section being of less diameter than its section and forming an intervening space receiving the inner section, flexible tubing arranged within the linings, and the tapering wedging sleeves fitted within the flexible tubing and compressing the same against the linings, substantially as described.

In testimony that I claim the foregoing as my own I have hereto affixed my signature in the presence of two witnesses.

BENJAMIN FRANKLIN STONE.

Witnesses:
R. J. HAMILTON,
JOHN C. HAY.